United States Patent
Hirosawa

(10) Patent No.: US 7,221,111 B2
(45) Date of Patent: May 22, 2007

(54) SWITCHING POWER SUPPLY DEVICE AND METHOD OF CONTROLLING THE SWITCHING DEVICE

(75) Inventor: Hideki Hirosawa, Fujioka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/314,420

(22) Filed: Dec. 20, 2005

(65) Prior Publication Data

US 2006/0138973 A1    Jun. 29, 2006

(30) Foreign Application Priority Data

Dec. 27, 2004   (JP)   .............................. 2004-378075

(51) Int. Cl.
*H05B 37/02*   (2006.01)

(52) U.S. Cl. ...................... 315/360; 315/291; 315/307; 315/224; 315/194; 315/DIG. 7; 363/21.11; 363/21.12; 363/21.14; 363/45

(58) Field of Classification Search ................ 315/291, 315/247, 194, 360, 362, 282, 200 R, 216, 315/227 R, 232, 224, DIG. 7; 363/21.01, 363/21.1, 21.11–21.18, 21.06, 45, 97
See application file for complete search history.

(56) References Cited

U.S. PATENT DOCUMENTS

| 4,868,729 A | * | 9/1989 | Suzuki | .................... 363/21.15 |
| 6,185,111 B1 | * | 2/2001 | Yoshida | ....................... 363/17 |
| 6,631,082 B2 | * | 10/2003 | Birumachi | ................... 363/97 |

FOREIGN PATENT DOCUMENTS

| JP | 05-341262 | 12/1993 |
| JP | 09-005705 | 1/1997 |
| JP | 09-331680 | 12/1997 |
| JP | 2002-101660 | 4/2002 |

* cited by examiner

*Primary Examiner*—Haissa Philogene
(74) *Attorney, Agent, or Firm*—Blakely Sokoloff Taylor & Zafman, LLP

(57) ABSTRACT

According to one embodiment, the switching power supply device comprises a DC-DC converter, an alternating current driver circuit, a smoothing capacitor and control circuitry. The control circuitry operates for adjusting a phase of an oscillation signal from the alternating current driver circuit to coincide start time points of current conducting periods between the output stage of the DC-DC converter and an input stage of the alternating current driver circuit.

20 Claims, 12 Drawing Sheets

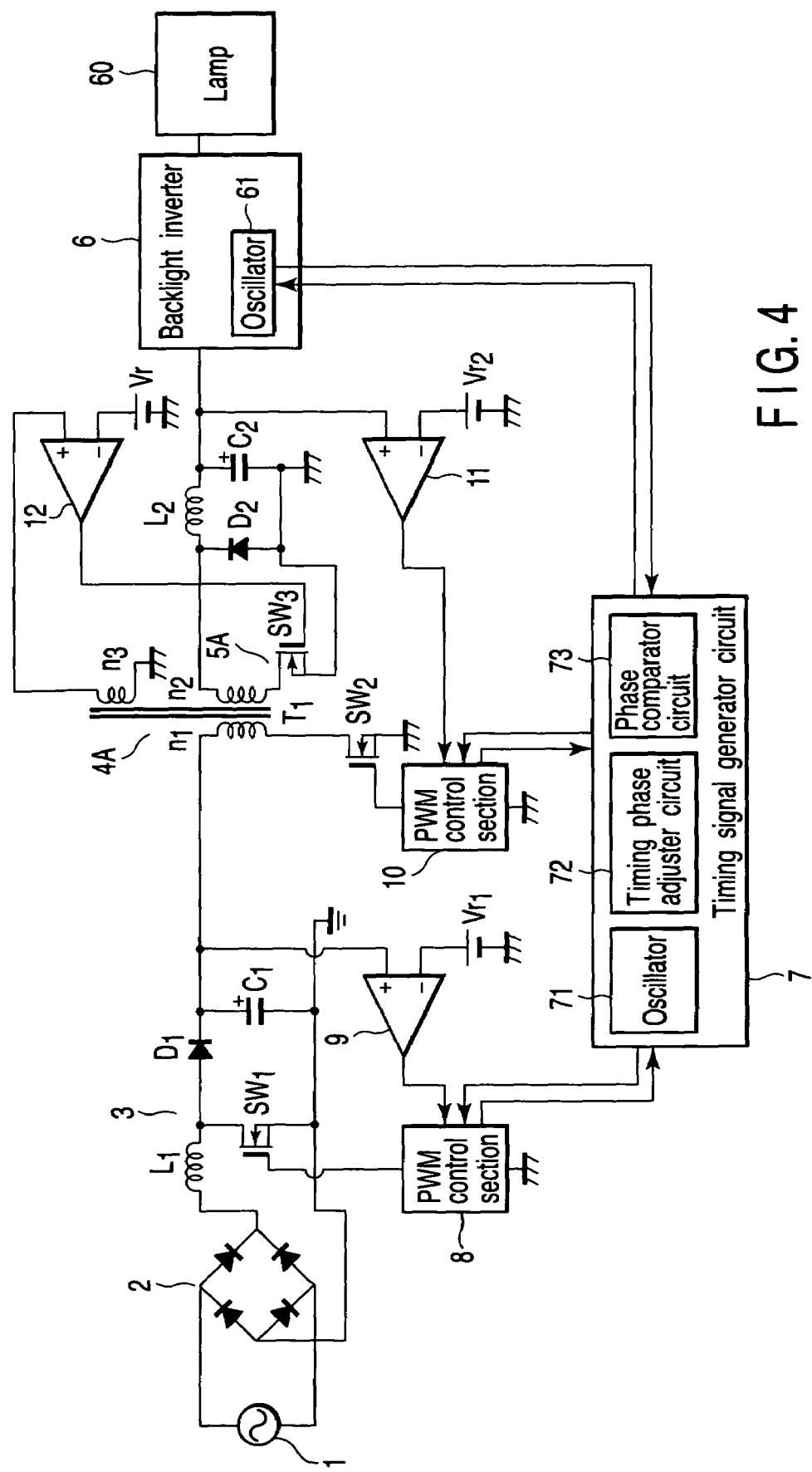
F I G. 4

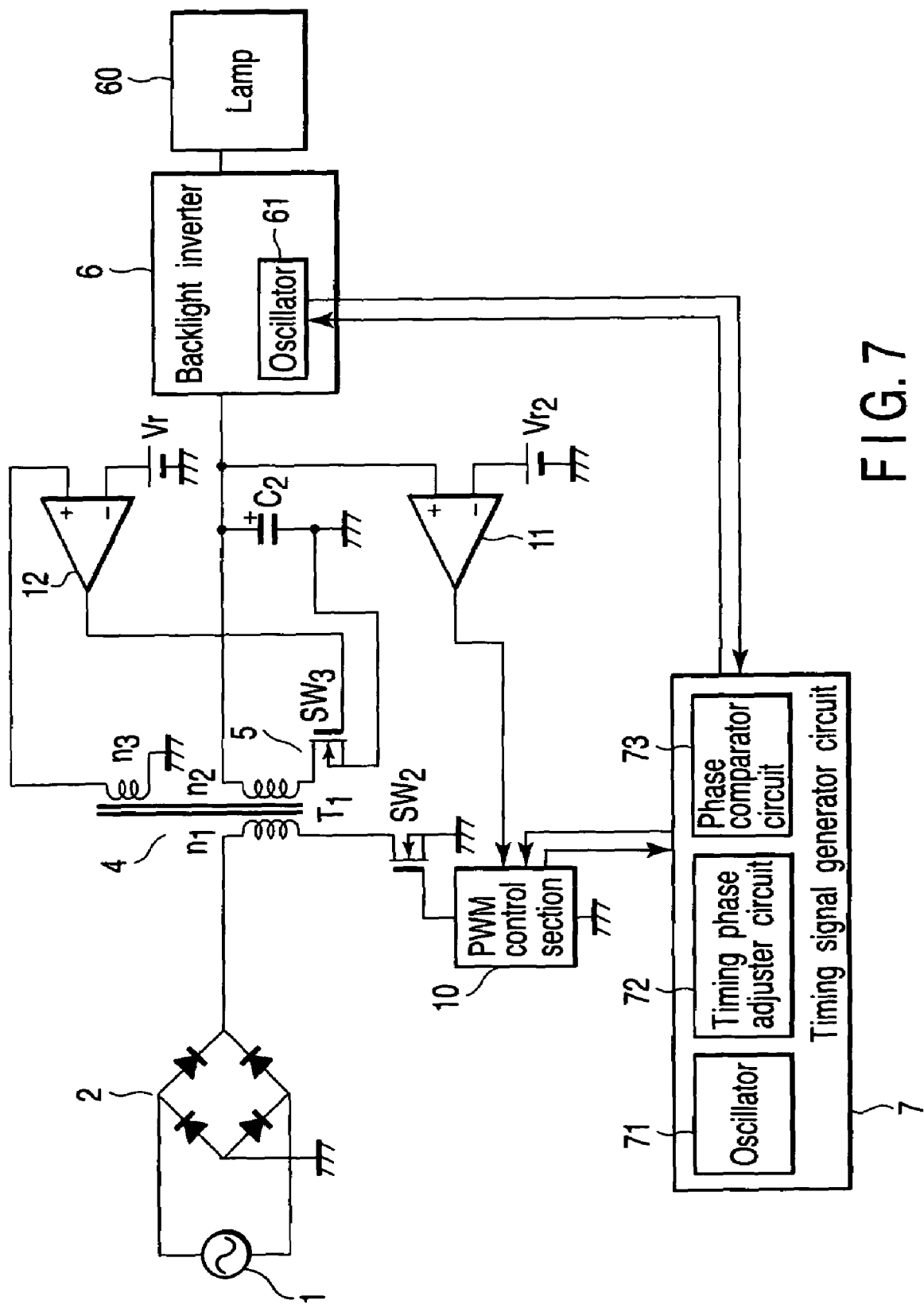
F I G. 7

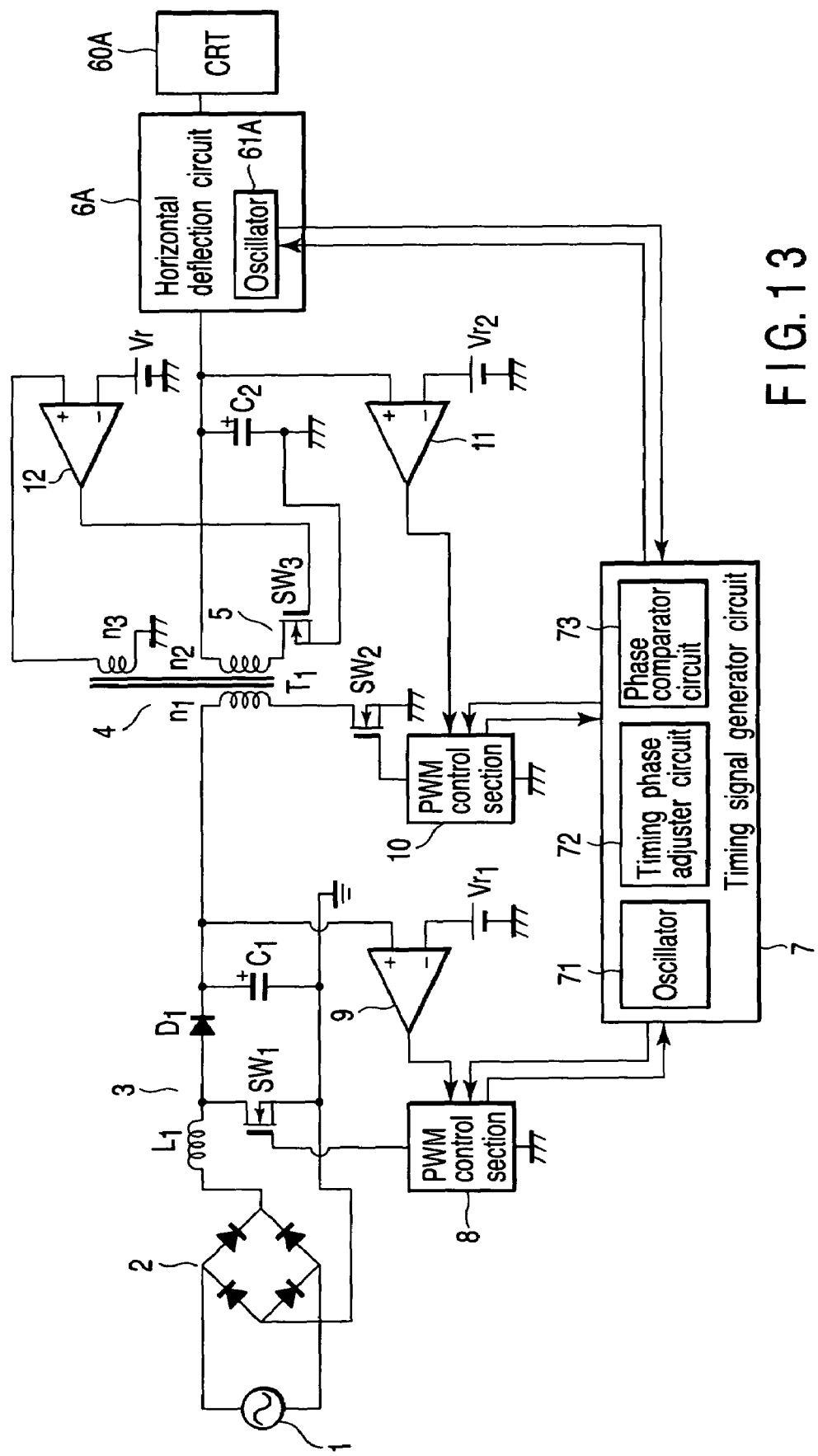
F I G. 13

SWITCHING POWER SUPPLY DEVICE AND METHOD OF CONTROLLING THE SWITCHING DEVICE

CROSS-REFERENCE TO RELATED APPLICATIONS

This application is based upon and claims the benefit of priority from prior Japanese Patent Application No. 2004-378075, filed Dec. 27, 2004, the entire contents of which are incorporated herein by reference.

BACKGROUND

1. Field

Embodiments of the present invention relate to a switching device comprising an optional power factor improvement converter, a DC-DC converter, a synchronizing rectifier circuit, and an alternating current driver circuit, and a method of controlling the switching device.

2. Description of the Related Art

Conventionally, as a switching power supply device comprising a power factor improvement converter and a DC-DC converter, there has been proposed a power supply device in which a switching power supply device is configured by combining a power factor correction (PFC) power supply section for switching a pulse current obtained by rectifying an alternating current (AC) power supply with a DC-DC power supply section for switching a direct current obtained by rectifying and smoothing the alternating current power supply so as to control a switching element of each of the power supply sections to be driven by one servo loop; and pulse width modulating means is provided to differentiate a pulse width of a drive pulse of a first switching element for switching the PFC power supply section and a pulse width of a drive pulse of a second switching element for switching the DC-DC power supply section from each other, thereby achieving high efficiency, downsizing, and restriction of generation of a harmonic current (refer to Jpn. Pat. Appln. KOKAI Publication No. 2002-101660, for example).

However, in a conventional switching power supply device as described in Jpn. Pat. Appln. KOKAI Publication No. 2002-101660, a smoothing capacitor for use in rectification has a high capacitance and a large current flows through the smoothing capacitor. In addition, the ripple voltage and ripple current of the smoothing capacitor are large, and thus, the smoothing capacitor is designed with a large capacitance. This large capacitance accounts for approximately 20% of the entire power supply device cost.

BRIEF DESCRIPTION OF THE SEVERAL VIEWS OF THE DRAWING

FIG. 4 is an exemplary block circuit diagram depicting a switching power supply device according to a second embodiment of the present invention;

FIG. 7 is an exemplary block circuit diagram depicting a switching power supply device according to a third embodiment of the present invention;

FIG. 13 is an exemplary block circuit diagram depicting a switching power supply device using a horizontal deflecting circuit as another example of an alternating current driver circuit.

DETAILED DESCRIPTION

Figure 1:
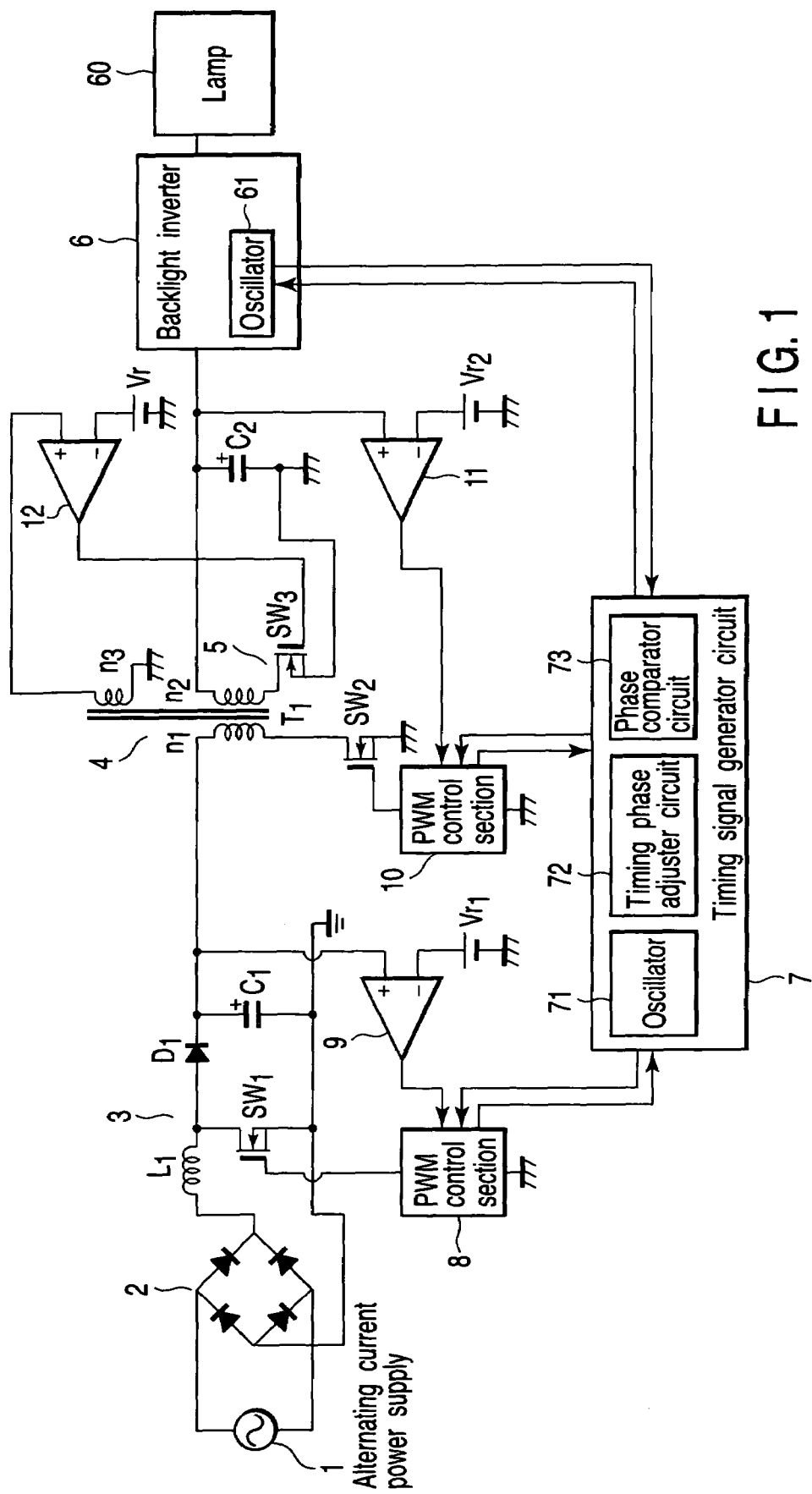
FIG. 1 is an exemplary block circuit diagram depicting a switching power supply device according to a first embodiment of the present invention.
Figure 2:
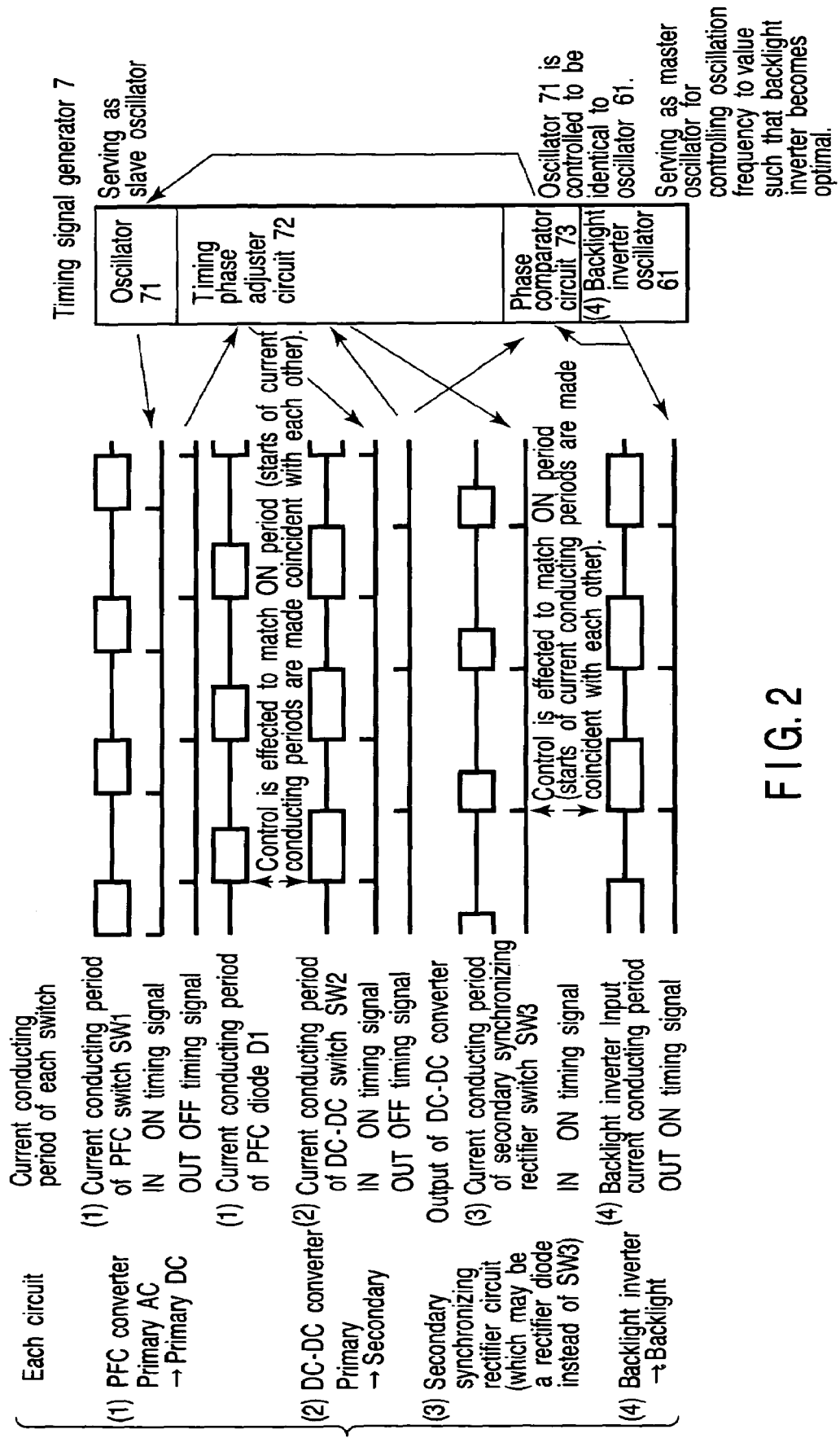
FIG. 2 is an exemplary timing chart showing a timing of a current conducting period of each of switches SW1 to SW3 in the device shown in FIG. 1.
Figure 3:
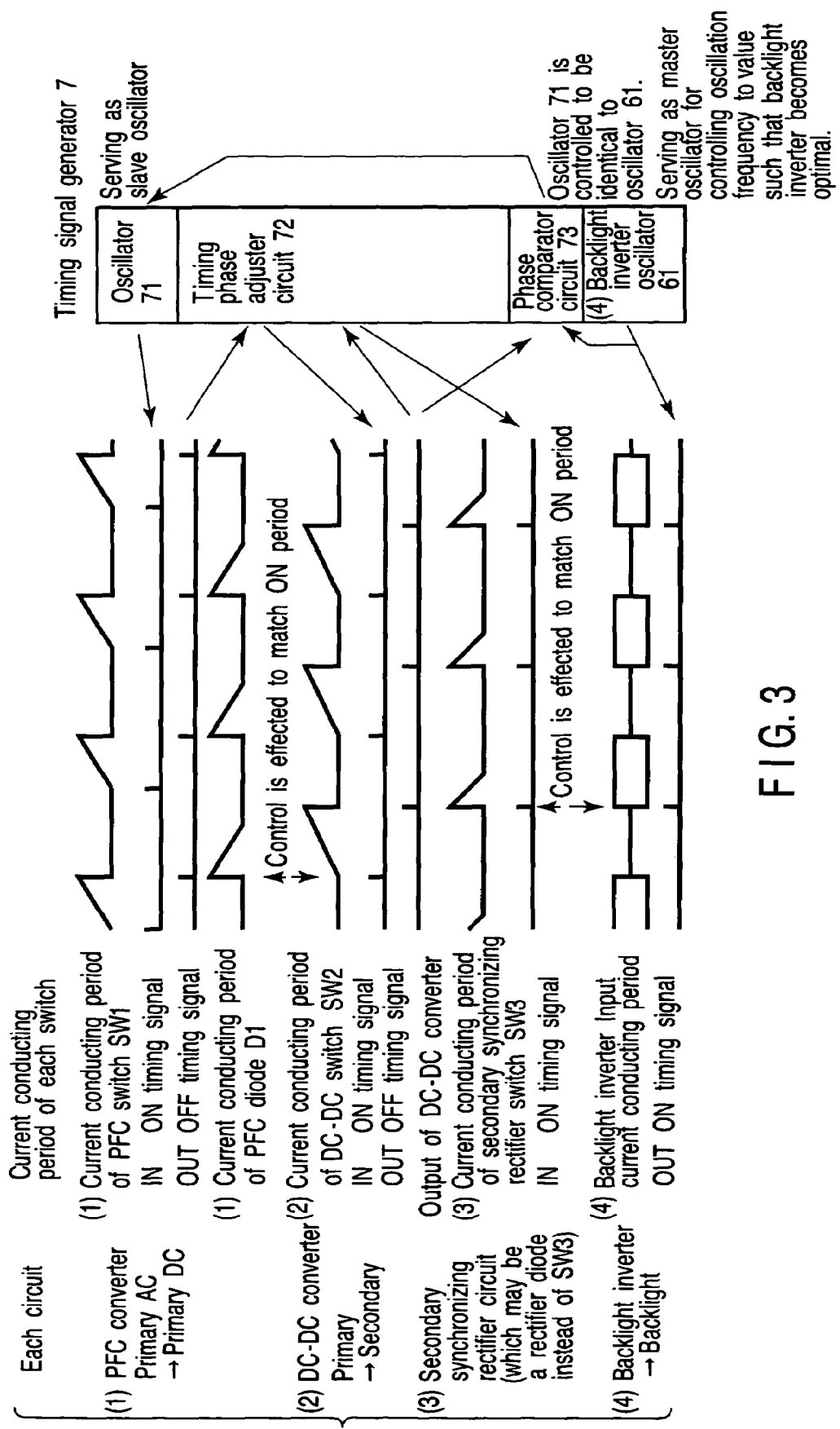
FIG. 3 is an exemplary timing chart showing a current waveform of each of the switches SW1 to SW3 in the device shown in FIG. 1.

Hereinafter, embodiments of the present invention will be described with reference to the accompanying drawings. FIGS. 1 to 3 each illustrate a first embodiment of the present invention. FIG. 1 shows a switching power supply device according to the first embodiment.

In FIG. 1, the switching power supply device comprises: a rectifier circuit 2 for rectifying a voltage of an alternating current power supply; a voltage increasing chopper circuit 3 serving as a power factor improvement converter (PFC); a DC-DC converter 4 having a converter transformer T1; a synchronizing rectifier circuit 5; a backlight inverter 6 serving as an alternating current driver circuit for driving a backlight such as a liquid crystal panel; and control circuitry (e.g., components 7 to 12).

The rectifier circuit 2 is composed of a full-wave diode bridge, for example, for fully rectifying a commercially available alternating current (AC) voltage from an alternating current (AC) power supply 1. A negative output end of the rectifier circuit 2 is connected to a reference electric potential point.

The voltage increasing chopper circuit 3 connects a coil L1 and a diode D1 to a positive output end of the rectifier circuit 2 in series. A connection point between the coil L1 and an anode of the diode D1 is connected to a drain of a power metal oxide semiconductor field effect transistor (power MOSFET) serving as a switching element SW1. A source of the power MOSFET is connected to a negative output end of the rectifier circuit 2, and a cathode of the diode D1 is connected to a negative output end of the rectifier circuit 2 via a smoothing capacitor C1.

A pulse signal (e.g., an oscillation signal) whose pulse width is controlled is input from a PWM control section 8 to a gate of the switching element SW1. A feedback loop for controlling a pulse width of an oscillation signal input to the gate of the switching element SW1 is configured so that an output voltage of the voltage increasing chopper circuit 3 obtained at the connection point between the cathode of the diode D1 and the smoothing capacitor C1 is input to a positive input end of a comparator circuit 9.

In addition to the above-described connection, a negative input end of the comparator circuit 9 is connected to a reference voltage source of a reference voltage Vr1. Also, an error output between the output voltage at the comparator circuit 9 and the reference voltage Vr1 is supplied to the PWM control section 8. An output voltage of the voltage increasing chopper circuit 3 is obtained as the reference voltage Vr1 in the comparator circuit 9 and the PWM control section 8.

The oscillation signal input to the gate of the switching element SW1 is obtained by controlling an oscillation signal supplied from a timing signal generator circuit 7 by means of the PWM control section 8 on a pulse width basis.

The voltage increasing chopper circuit 3 switches an alternating current voltage of the alternating current power supply 1 at a predetermined frequency at the first switching element SW1 via the coil L1. This chopper circuit 3 smoothes and outputs energy maintained in the coil L1 when the switching element SW1 is turned on and smoothes and outputs the energy by the first smoothing capacitor C1 via the diode D1 when the switching element SW1 is turned off.

When the switching element SW1 is turned on, energy is accumulated in the coil L1. When the switching element SW1 is turned off, the diode D1 becomes conductive. Then, the energy accumulated in the coil L1 is discharged to the smoothing capacitor C1. At this time, a voltage generated in the coil L1 is added to an input voltage in series, and thus, an output voltage of the smoothing capacitor C1 is higher than the input voltage.

The DC-DC converter 4 has a converter transformer T1. A positive output end of the smoothing capacitor C1 of the voltage increasing chopper circuit 3 is connected to one end of a primary coil n1 of the transformer T1, the other end of the primary coil n1 is connected to a drain of a power MOSFET serving as a switching element SW2 further including a source that is connected to a reference electric potential point. One end of a secondary coil n2 of the transformer T1 is connected to the reference electric potential point via the smoothing capacitor C2, and the other end of the secondary coil n2 is connected to the reference electric potential point via the drain/source of power MOSFET serving as a switching element SW3.

Figure 11:
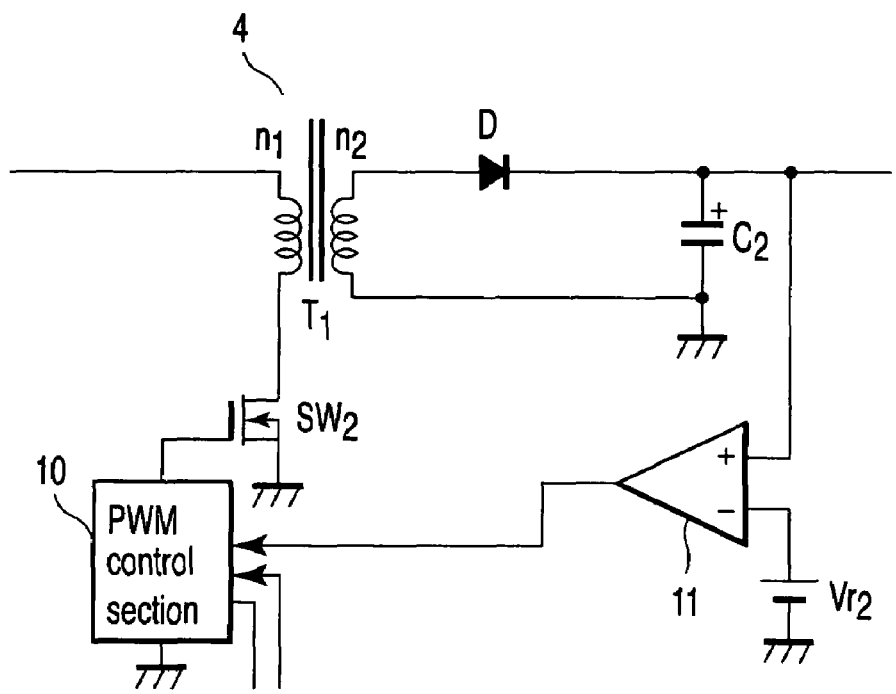
FIGS. 11 and 12 are exemplary block circuit diagrams each showing another example of a secondary synchronizing rectifier circuit of a transformer of a DC-DC converter.

A transistor of the switching element SW3 functions as a transistor for use in synchronizing rectification and has an advantage that a voltage drop is reduced, resulting in a small power loss as compared with a case of using a rectifier diode (refer to FIG. 11).

A pulse signal (e.g., an oscillation signal) whose pulse width is controlled is input from the PWM control section 10 to a gate of the switching element SW2.

A feedback loop for controlling a pulse width of an oscillation signal input to the gate of the switching element SW2 is configured so that an output voltage of the DC-DC converter 4 obtained at a connection point between the secondary coil n2 and the smoothing capacitor C2 (e.g., output of the synchronizing rectifier circuit 5) is input to a positive input end of a comparator circuit 11.

In addition, a negative input end of the comparator circuit 11 is connected to a reference voltage source of a reference voltage Vr2. An error output between the output voltage at the comparator circuit 11 and the reference voltage Vr2 is supplied to the PWM control section 10. An output voltage of the DC-DC converter 4 is obtained as the reference voltage Vr2 at the comparator circuit 11 and the PWM control section 10.

An oscillation signal input to the gate of the switching element SW2 is obtained by controlling an oscillation signal supplied from the timing signal generator circuit 7 by means of the PWM control section 10 on a pulse width basis.

A voltage obtained from a secondary coil n3 arranged at a secondary side of the converter transformer T1 is input to a positive input end of a comparator circuit 12. A reference voltage source of the reference voltage Vr is connected to a negative input end of the comparator circuit 12. A comparison output of the comparator circuit 12 is input to a gate of the switching element SW3 for use in synchronizing rectification.

The DC-DC converter 4 switches the output voltage from the voltage increasing chopper circuit 3 by the second switching element SW2 connected to the primary coil n1 of the transformer T1 in series, and smoothes and outputs the switched voltage by the second smoothing capacitor C2 connected to the secondary coil n2.

The synchronizing rectifier circuit 5 carries out synchronizing rectification by the switching element SW3 and the second smoothing capacitor C2, the switching element being provided on an output line of the secondary coil n2 of the converter transformer T1.

The synchronizing rectifier circuit 5, according to the first embodiment, is provided at the secondary side of the converter transformer T1 of the DC-DC converter 4, configuring a secondary circuit of a flyback type DC-DC converter 4 such that the secondary switching element SW3 is turned on in synchronism with a timing of turning off a state in which the switching element SW2 connected to the primary coil n1 is turned on, and the energy accumulated in the secondary coil n2 is discharged to the smoothing capacitor C2.

The backlight inverter 6 has a first oscillator 61 and drives an electric power discharge lamp 60 for backlight serving as a load by receiving an output voltage from the synchronizing rectifier circuit 5 and carrying out switching using a first oscillation signal from the first oscillator 61.

The control circuitry 7–12 adjusts a phase of the first oscillation signal and control an operating timing of each of the switching elements SW1 to SW3 based on the phase-adjusted first oscillation signal. In addition, the control circuitry 7–12 effect control so as to match start time points of a conducting period of a current among the circuits interconnected to each other while interposing at least a smoothing capacitor from among the voltage increasing chopper circuit 3, the DC-DC converter 4, the synchronizing rectifier circuit 5 and the backlight inverter 6. The control circuitry 7–12 control a current to be passed between the input side and the output side of each of the smoothing capacitors C1 and C2.

Namely, control is effected to match the starts of the current conducting periods of the circuit at the front stage and the circuit at the rear stage of the smoothing capacitors such that a current flowing into each of the smoothing capacitors C1 and C2 and a current flowing out of such capacitors C1 and C2 are reduced and a current flows from the input side to the output side.

However, turning on/off the switching element of each circuit of the switching power supply device is different from turning on/off the current conducting period of other electric parts. Thus, even if the starts of the current conducting periods of the circuits are made coincident with each other, the operations of turning off the current conducting periods are not made coincident with each other between the circuits.

The above control circuitry each comprises a timing signal generator circuit 7, a PWM control section 8, a PWM control section 10 and a comparator circuit 12. The timing signal generator circuit 7 comprises a second oscillator 71, a timing phase adjuster circuit 72 and a phase comparator circuit 73.

More specifically, the second oscillator 71 is controlled so as to oscillate at a frequency which is equal to that of the first oscillator provided at the backlight inverter 6. The timing phase adjuster circuit 72 is capable of adjusting a phase of a second oscillation signal from the second oscillator 71, controlling an operating timing of each of the switching elements SW1 to SW3, and matching the start time points of the conducting periods of the currents between the circuits interconnected to each other while interposing at least one of a smoothing capacitor from among the voltage increasing chopper circuit 3, the DC-DC converter 4, the synchronizing rectifier circuit 5 and the backlight inverter 6.

The phase comparator circuit 73 is adapted for phase-comparing a second oscillation signal whose phase has been adjusted by the timing phase adjuster circuit 72 with the first oscillation signal of the first oscillator 61 and controlling the second oscillator 71 such that a phase relationship between the first and second oscillation signals is constant when its phase comparison output is provided.

The PWM control section 8 receives the second oscillation signal from the second oscillator 71, compares an output voltage of the voltage increasing chopper circuit 3 with a reference voltage Vr1 by a comparator circuit 9 to control a pulse width of the second oscillation signal such that the output voltage becomes constant, and controls the switching element SW1 to be switched by the second oscillation signal of the thus controlled pulse width.

The PWM control section 10 receives the phase-adjusted second oscillation signal from the timing phase adjuster circuit 72, compares an output voltage of the DC-DC converter 4 with a reference voltage Vr2 by a comparator circuit 11 to control a pulse width of the phase-adjusted second oscillation signal such that the output voltage becomes constant, and controls the switching element to be switched by the second oscillation signal having the controlled pulse width. The comparator circuit 12 serving as a control section compares a voltage obtained from a secondary coil n3 of the converter transformer T1 with a reference voltage Vr and controls the switching element SW3 for synchronizing rectification to be switched based on its comparison result.

Now, an operation of the switching power supply device configured above will be described with reference to FIGS. 2 and 3. In the following description, the switching element SW1 is defined as a PFC switch SW1, the switching element SW2 is defined as a DC-DC switch SW2, and the switching element SW3 is defined as a secondary synchronizing rectifier switch SW3.

FIG. 2 shows a timing of a current conducting period of each of the switches SW1 to SW3 in the device of FIG. 1. In addition, FIG. 3 shows a current waveform of each of the switches SW1 to SW3. The rise and fall of each current waveform are identical to those in timing of the current conducting period shown in FIG. 2.

As shown in (1) of FIG. 2, an on-timing (in) to off-timing (out) of the PFC switch SW1 of the PFC converter 3 corresponds to an on period controlled by the PWM control section 8. During this on period, energy is accumulated in the PFC coil L1 and is discharged to the PFC diode D1, and thus, in and out periods are shifted in view of time intervals.

The on/off period of the PFC switch SW1 is control by the PWM control section 8 such that a PFC output voltage is obtained as the reference voltage Vr1.

At the off-timing (out) of the PFC switch SW1, a current flows through the PFC diode D1 of FIG. 1 due to the energy accumulated in the PFC coil L1, and at the same time, the DC-DC switch SW2 of the DC-DC converter 4 is turned on, as shown in (2) of FIG. 2.

Namely, the primary side which is an output stage of the PFC converter 3 and which is an input stage of the DC-DC converter 4 is turned on at the same time while the smoothing capacitor C1 is interposed, and the starts of the current conducting periods are made coincident with each other. In this manner, a ripple current of the smoothing capacitor C1 can be reduced.

The current conducting period of the DC-DC switch SW2 shown in (2) of FIG. 2 corresponds to an on period controlled by the PWM control section 10 from the on-timing (in) of the DC-DC switch SW2. In synchronism with its off-timing (out), the secondary synchronizing rectifier switch SW3 of the converter transformer T1 is turned on as shown in (3) of FIG. 2.

This is because the DC-DC converter 4 is controlled so as to configure a feedback type converter. Namely, energy is accumulated in the converter T1 during the on period of the DC-DC switch SW2, and the accumulated energy is discharged from the secondary side of the transformer T1 at the off-timing of the DC-DC switch SW2 (=on-timing of the secondary synchronizing rectifier switch SW3). Thus, the on-timing of the primary DC-DC switch SW2 and the on-timing of the secondary synchronizing rectifier switch SW3 are shifted from each other.

Then, the starts (start time points) of the input current conducting periods of the backlight inverter 6 are made coincident with each other in synchronism with the timing (in) of turning on the secondary synchronizing rectifier switch SW3. A current flows through the smoothing capacitor C2 due to the energy accumulated in the secondary coil n2 of the converter transformer T1 of the DC-DC converter 4, and at the same time, a switching element (not shown) in the backlight inverter 6 is turned on, and an input current begins flowing, as shown in (4) of FIG. 2.

Namely, the output stage of the DC-DC converter 4 and the input stage of the backlight inverter 6 are turned on at the same time while the smoothing capacitor C2 is interposed, and the starts of the current conducting periods are made coincident with each other. In this manner, a ripple current of the smoothing capacitor C2 can be reduced. The above timing relationship shown in FIG. 3 is identical to that shown in FIG. 2.

Figure 5:
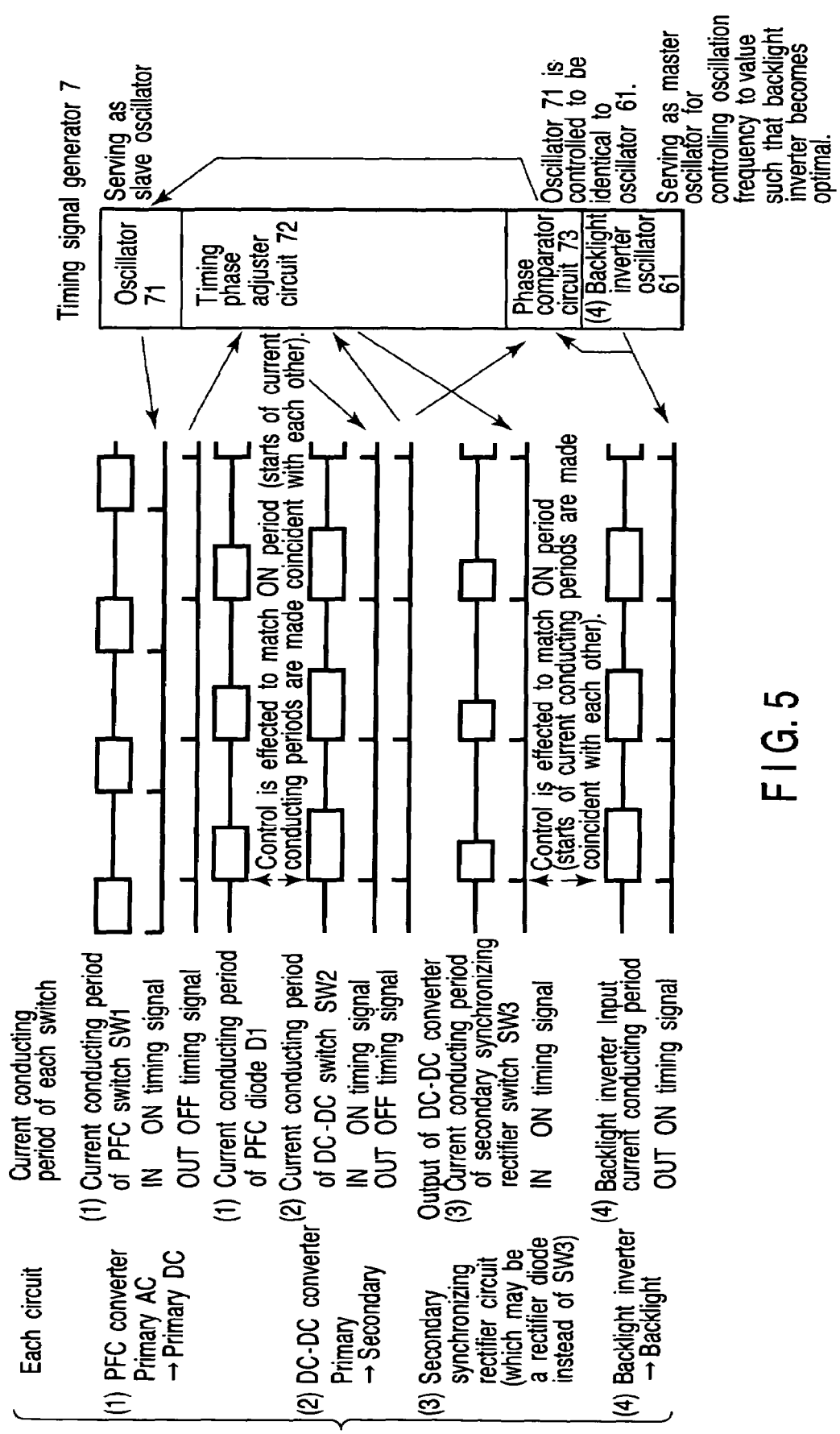
FIG. 5 is an exemplary timing chart showing a timing of a current conducting period of each of the switches SW1 to SW3 in the device shown in FIG. 4.
Figure 6:
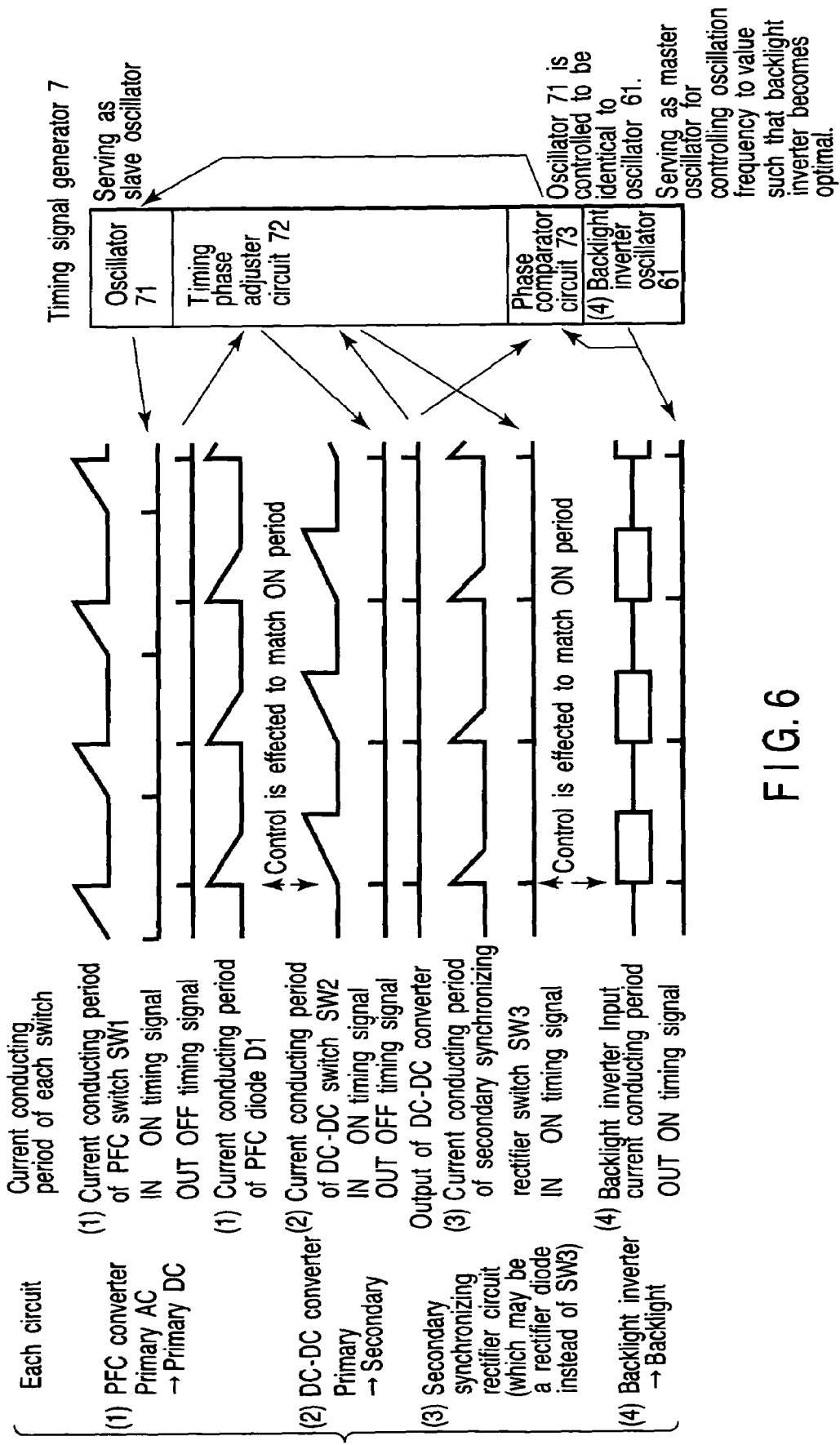
FIG. 6 is an exemplary timing chart showing a current waveform of each of the switches SW1 to SW3 in the device shown in FIG. 4.

Now, a second embodiment of the present invention will be described here. FIGS. 4 to 6 illustrate the second embodiment of the invention. FIG. 4 shows a switching power supply device according to the second embodiment. The DC-DC converter 4 in the switching power supply device according to the first embodiment is a flyback-type converter, whereas the second embodiment shows a case in which a DC-DC converter 4A is a forward-type converter.

FIG. 4 is different from FIG. 1 in that a secondary circuit to be connected to a converter transformer T1 of the DC-DC converter 4A is used because the forward type DC-DC converter 4A is provided. A configuration in which a coil L2 and a diode D2 are added to the power supply device of FIG. 1 is provided. That is, in FIG. 4 according to the second embodiment, the secondary circuit to be connected to the converter transformer T1 is provided as a circuit configuration equivalent to a voltage decreasing converter. This secondary circuit is composed of a switching element SW3, a coil L2, a smoothing capacitor C2, and a flowback diode D2 parallel to L2 and C2.

Therefore, a secondary synchronizing rectifier circuit 5A is configured in the same way as a voltage decreasing converter composed of a switching element SW3, a coil L2, a smoothing capacitor C2, and a flowback diode D2 parallel to L2 and C2. The other constituent elements are identical to those shown in FIG. 1.

Now, an operation of the switching power supply device configured above will be described with reference to FIGS. 5 and 6.

FIG. 5 shows a timing of a current conducting period of each of the switches SW1 to SW3 in the device of FIG. 4. In addition, FIG. 6 shows a current waveform of each of the switches SW1 to SW3. The rise and fall of each current waveform are identical to the timing of the current conducting period shown in FIG. 5.

As shown in (1) of FIG. 5, an on-timing (in) to off-timing (out) of the PFC switch SW1 of the PFC converter 3 corresponds to the on period controlled by the PWM control section 8. During this on period, energy is accumulated in the PFC coil L1 and is discharged to the PFC diode D1, and thus, in and out are shifted in view of time intervals.

The on/off period of the PFC switch SW1 is controlled by the PWM control section 8 such that the PFC output voltage is obtained as the reference voltage Vr.

At the off-timing (out) of the PFC switch SW1, a current flows through the PFC diode D1 due to the energy accumulated in the PFC coil L1, and at the same time, the DC-DC switch SW2 of the DC-DC converter 4A is turned on as shown in (2) of FIG. 5.

Namely, the primary side which is an output stage of the PFC converter 3 and which is an input stage of the DC-DC converter 4A is turned on at the same time while the smoothing capacitor C1 is interposed, and the starts during the current conducting periods are made coincident with each other. In this manner, a ripple current of the smoothing capacitor C1 can be reduced.

The current conducting period of the DC-DC switch shown in (2) of FIG. 5 corresponds to the on period controlled by the PWM control section 10 from the on-timing (in) of the DC-DC switch SW2. In synchronism with the on-timing (in), the secondary synchronizing rectifier switch SW3 of the converter transformer T1 is turned on as shown in (3) of FIG. 5. This is because the DC-DC converter 4A is controlled so as to configure a forward type converter.

Namely, the energy excited at the secondary side of the converter T1 during the on period of the DC-DC switch SW2 is discharged from the secondary side of the transformer T1 at the on-timing of the synchronizing rectifier switch SW3 synchronized with the DC-DC switch SW2, and the starts of the current conducting periods of the primary DC-DC switch SW2 and the secondary synchronizing rectifier switch SW3 are made coincident with each other.

Then, the starts (start time points) of the input current conducting periods of the backlight inverter 6 are made coincident with each other in synchronism with the timing (in) of turning on the secondary synchronizing rectifier switch SW3. When the synchronizing rectifier switch SW3 is turned on, a current flows through the smoothing capacitor C2 via the coil L2 due to the energy excited at the secondary side of the converter transformer T1 of the DC-DC converter 4A. When the synchronizing rectifier switch SW3 is turned on, a direct current voltage smoothed by a voltage decreasing operation such that a current flows through the flowback diode D2 is output from the smoothing capacitor C2 at any time. Moreover, the synchronizing rectifier switch SW3 is turned on, and at the same time, a switching element (not shown) in the backlight inverter 6 is turned on as shown in (4) of FIG. 5, and an input current begins flowing.

Namely, the output stage of the DC-DC converter 4A and the input stage of the backlight inverter 6 are simultaneously turned on while the smoothing capacitor C2 is interposed, and the starts of the current conducting periods are made coincident with each other. In this manner, a ripple current of the smoothing capacitor C2 can be reduced. The above timing relationship shown in FIG. 6 is identical to that shown in FIG. 5.

Since the forward type converter is used as the DC-DC converter 4A in the second embodiment, the starts of the current conducting periods at the primary and secondary sides of the converter transformer T1 can be also made coincident with each other.

While the first and second embodiments described above provide a power factor improvement converter (PFC converter) 3 at a rear stage of a full-wave rectifier circuit 2, the present invention can be applied to a power supply device having no PFC converter 3. This power supply device will be described in accordance with third and fourth embodiments.

Figure 8:
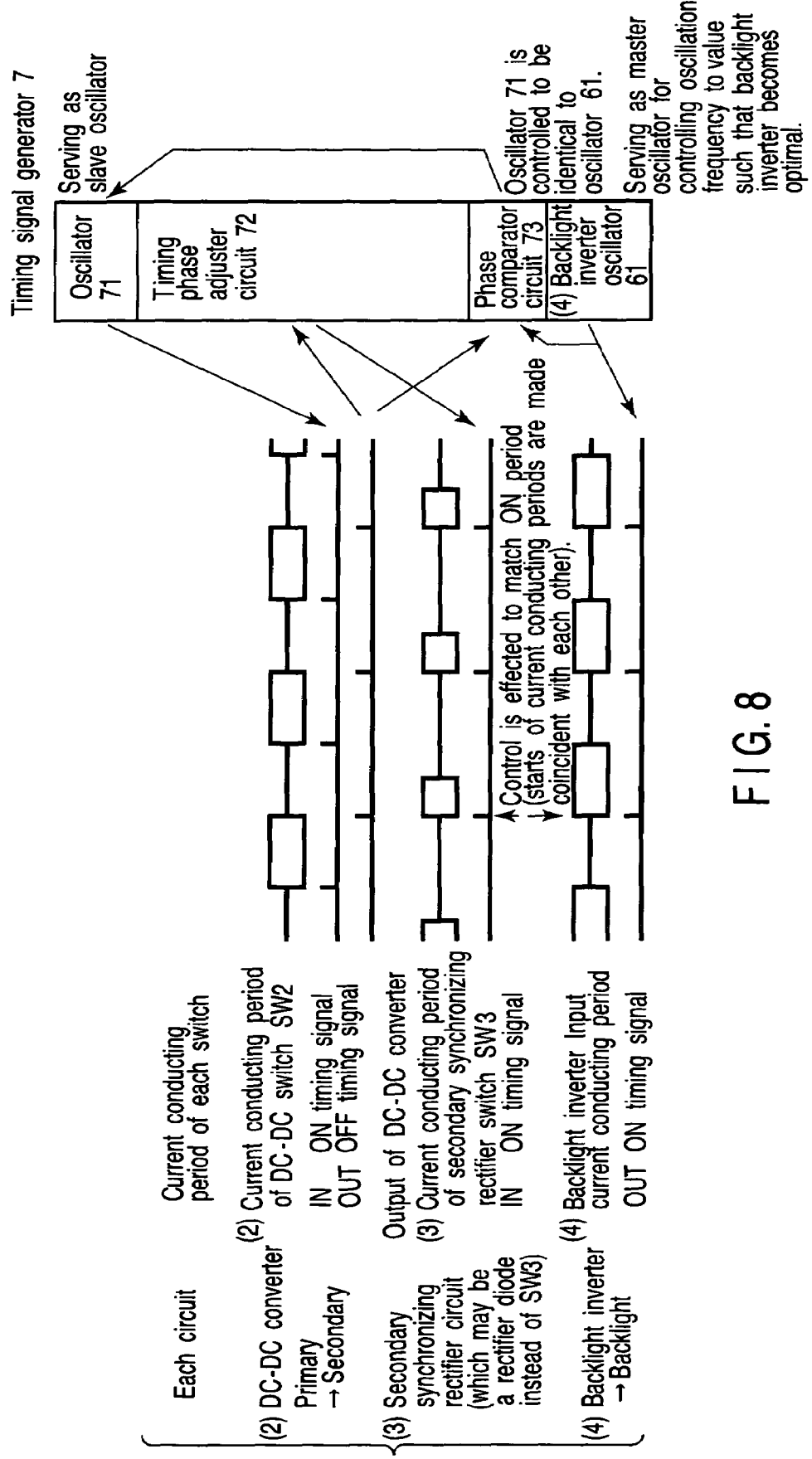
FIG. 8 is an exemplary timing chart showing a timing of a current conducting period of each of the switches SW1 to SW3 in the device shown in FIG. 7.

FIGS. 7 and 8 illustrate a third embodiment of the present invention. FIG. 7 shows a switching power supply device according to the third embodiment. FIG. 8 shows a timing of a current conducting period of each of the switches SW1 to SW3 in the device of FIG. 7. A current waveform of each of the switches SW1 to SW3 is omitted here.

The third embodiment shown in FIG. 7 shows a switching power supply device in the case where no PFC converter 3 is provided in the first embodiment. In FIG. 7, the switching power supply device has a DC-DC converter 4 having a converter transformer T1, a synchronizing rectifier circuit 5, a backlight inverter 6 having a first oscillator 61, and control circuitry 7, 10, and 11. The DC-DC converter 4 switches a voltage obtained by rectifying a voltage of an alternating current power supply 1 at the primary side of the converter transformer T1 by means of a switching element SW2, and smoothes and outputs the switched voltage by a smoothing capacitor C2 connected to the secondary side of the transformer T1. The synchronizing rectifier circuit 5 carries out synchronizing rectification by a switching element SW3 and the smoothing capacitor C2, the switching element being provided on an output line at the secondary side of the converter transformer T1. The backlight inverter 6 serving as an alternating current driver circuit drives a lamp 60 serving as a load by receiving an output voltage of the synchronizing rectifier circuit 5 and carrying out switching using a first oscillation signal from the first oscillator 61. The control circuitry 7, 10, and 11 adjust a phase of the first oscillation signal, control an operating timing of each of the switching elements SW2 and SW3 based on the phase-adjusted oscillation signal, and effect control so as to match start time points of the current conducting periods between circuits interconnected to each other while interposing at least a smoothing capacitor from among the DC-DC converter 4, the synchronizing rectifier circuit 5 and the backlight inverter 6.

The above control circuitry each comprise: a timing signal generator circuit 7, a PWM control section 10, and a comparator circuit 12. The timing signal generator circuit 7 comprises: a second oscillator 71 controlled so as to oscillate at a frequency equal to that of the first oscillator provided at the backlight inverter 6; a timing phase adjuster circuit 72 capable of adjusting a phase of a second oscillation signal from the section oscillator 71, controlling an operating timing of each of the switching elements SW2 and SW3 based on the phase-adjusted second oscillation signal, and matching start time points of current conducting periods between the circuits interconnected to each other while interposing at least a smoothing capacitor from among the DC-DC converter 4, the synchronizing rectifier circuit 5 and the backlight inverter 6; and a phase comparator circuit 73 for phase-comparing a second oscillation signal whose phase has been adjusted by the timing phase adjuster circuit 72 and controlling the second oscillator 71 such that a phase relationship between the first and second oscillation signals is established as a predetermined relationship at its phase comparison output. The PWM control section 10 receives the second oscillation signal whose phase has been adjusted from the timing phase adjuster circuit 72, compares an output voltage of the DC-DC converter 4 with a reference voltage Vr2 by a comparator circuit 11 to control a pulse width of the phase-adjusted second oscillation signal such that the output voltage becomes constant, and controls the switching element SW2 to be switched by a second oscillation signal of the controlled pulse width. The comparator circuit 12 serving as a control section compares a voltage obtained from a secondary coil n3 of the converter transformer T1 with a reference voltage Vr to control the switching element SW3 to be switched based on a result of the comparison.

An operation of the switching power supply device according to the third embodiment corresponds to an operation made after eliminating an operation of the PFC switch of (1) converter 3 in the description of FIG. 2 according to the first embodiment.

In the following description, the switching element SW2 is defined as a DC-DC switch SW2, and the switching element SW3 is defined as a secondary synchronizing rectifier switch SW3.

A current conducting period of the DC-DC switch SW2 shown in (2) of FIG. 8 corresponds to an on period controlled by the PWM control section 10 from an on-timing (in) of the DC-DC switch SW2. In synchronism with an off-timing (out) of the DC-DC switch SW2, the secondary synchronizing rectifier switch SW3 of the converter transformer T1 is turned on as shown in (3) of FIG. 8.

This is because the DC-DC converter 4 is controlled so as to configure a feedback type converter. Namely, energy is accumulated in the converter T1 during an on period of the DC-DC switch SW2, and is discharged from the secondary side of the transformer T1 at an off-timing of the DC-DC switch SW2 (=at an on-timing of the secondary synchronizing rectifier switch SW3). Thus, the on-timing of the primary DC-DC switch SW2 and the on-timing of the secondary synchronizing rectifier switch SW3 are shifted from each other.

The starts (start time points) of the input current conducting periods of the backlight inverter 6 are made coincident with each other in synchronism with the on-timing (in) of the secondary synchronizing rectifier switch SW3. A current flows through the smoothing capacitor C2 due to the energy accumulated in the secondary coil n2 of the converter transformer T1 of the DC-DC converter 4, and at the same time, a switching element (not shown) in the backlight inverter 6 begins flowing as shown in (4) of FIG. 8.

Namely, the output stage of the DC-DC converter 4 and the input stage of the backlight inverter 6 are simultaneously turned on while the smoothing capacitor C2 is interposed, and the starts of the current conducting periods are made coincident with each other. In this manner, a ripple current of the smoothing capacitor can be reduced.

Figure 9:
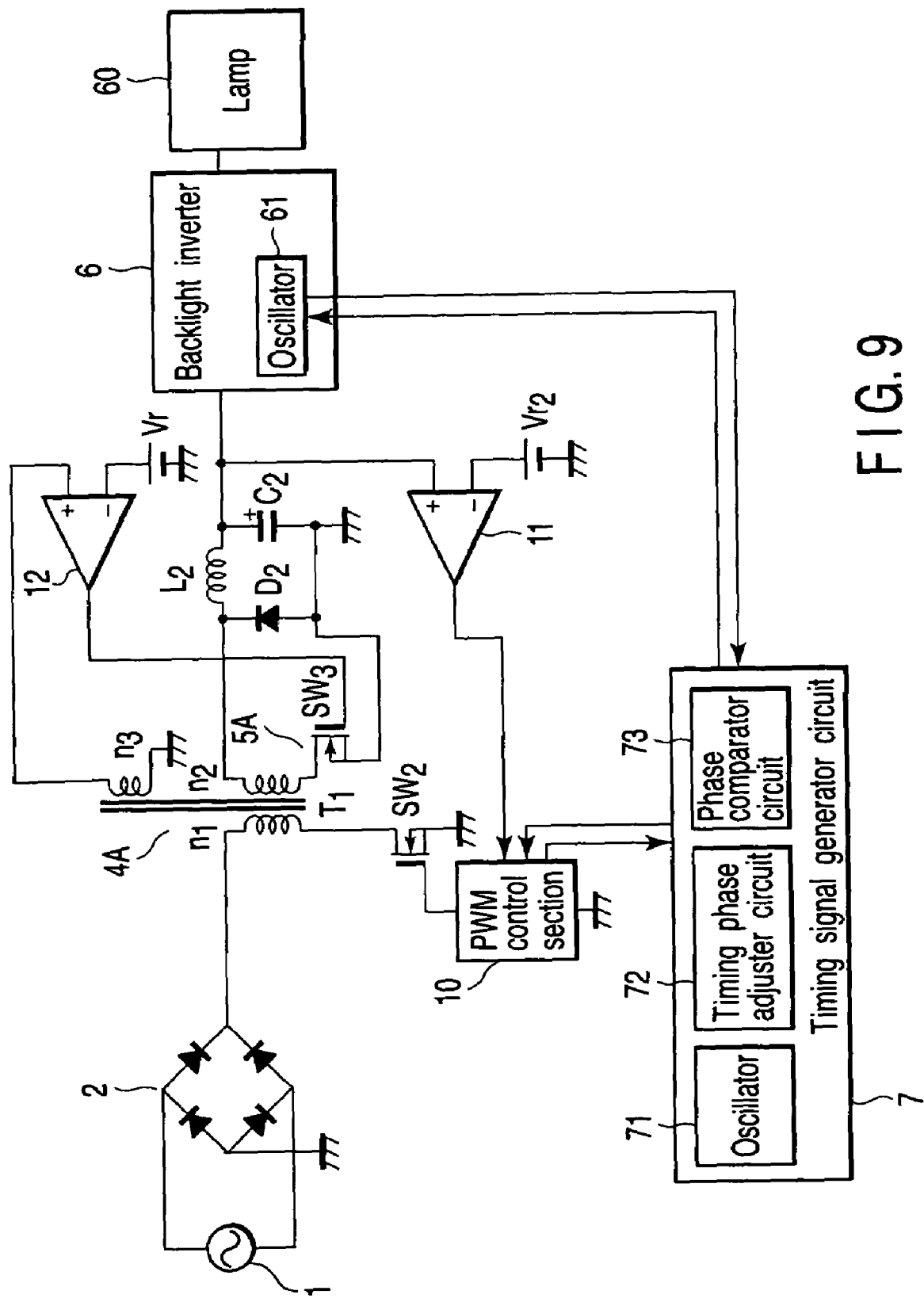
FIG. 9 is an exemplary block circuit diagram depicting a switching power supply device according to a fourth embodiment of the present invention.
Figure 10:
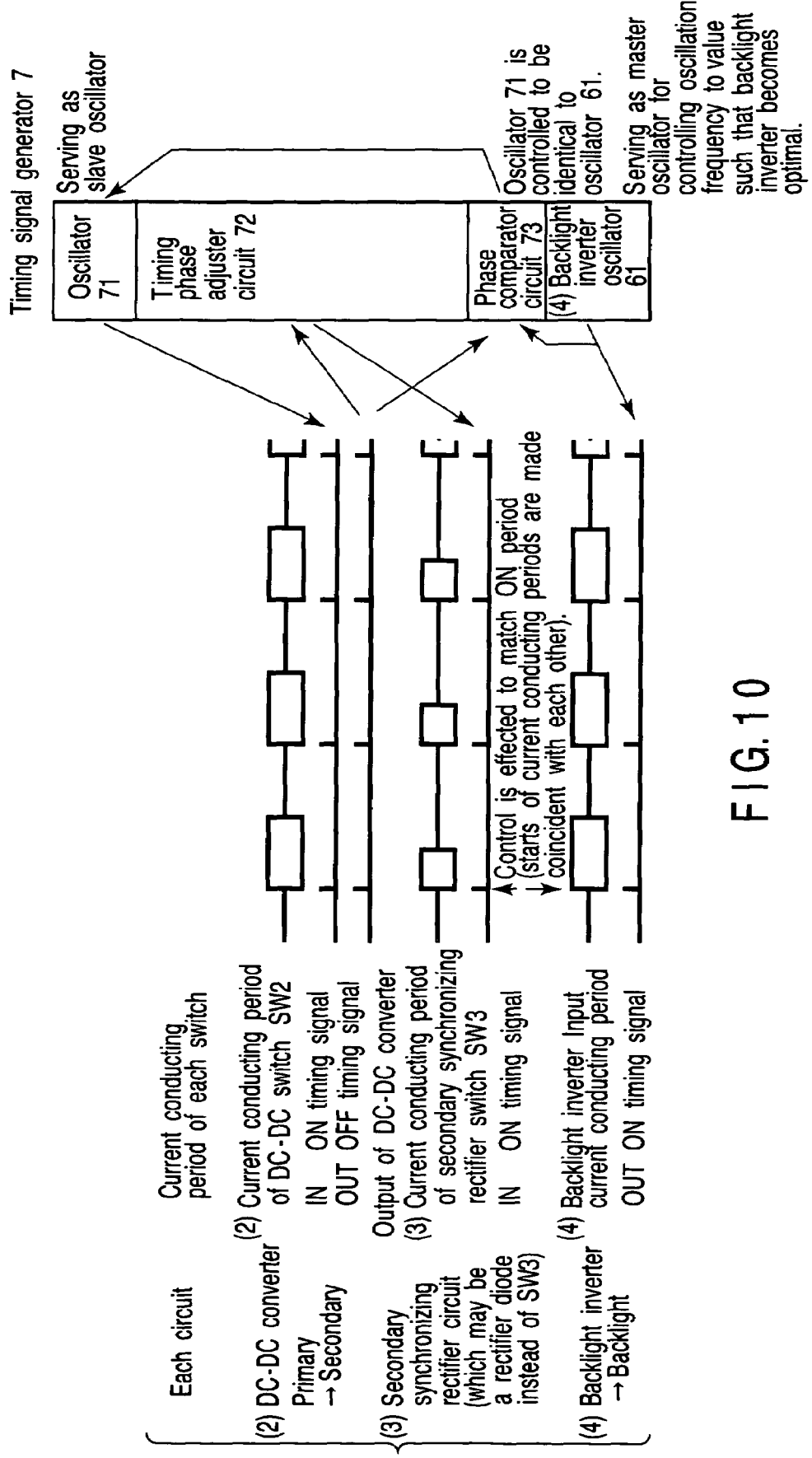
FIG. 10 is an exemplary timing chart showing a timing of a current conducting period of each of the switches SW1 to SW3 in the device shown in FIG. 9.

FIGS. 9 and 10 each illustrate a fourth embodiment of the present invention. FIG. 9 shows a switching power supply device according to the fourth embodiment. FIG. 10 shows a timing of a current conducting period of each of switches SW2 to SW3 in the device of FIG. 9. A current waveform of each of the switches SW2 to SW3 is omitted here.

The DC-DC converter 4 in the switching power supply device according to the third embodiment is a flyback type converter, whereas the fourth embodiment shows a case in which the DC-DC converter 4A is a forward type converter.

FIG. 9 is different from in FIG. 7 in that, because a forward type DC-DC converter 4A is used, a secondary circuit to be connected to a converter transformer T1 of the DC-DC converter 4A is used. A configuration in which a coil L2 and a diode D2 are added to the power supply device of FIG. 7 is provided. That is, in FIG. 9 according to the fourth embodiment, the secondary circuit to be connected to the converter transformer T1 is composed of a switching element SW3, a coil L2, a smoothing capacitor C2, and a flowback diode D2 parallel to L2 and C2. The secondary circuit is provided as a circuit configuration equivalent to a voltage decreasing converter.

Therefore, a secondary synchronizing rectifier circuit 5A is configured in the same way as a voltage decreasing type converter composed of a switching element SW3, a coil L2, a smoothing capacitor C2, and a flowback diode D2 parallel to L2 and C2. The other constituent elements are identical to those shown in FIG. 7.

An operation of the switching power supply device according to the fourth embodiment corresponds to an operation made after eliminating an operation of a PFC switch of (1) PFC converter 3 in the description of FIG. 5 according to the second embodiment.

A current conducting period of the DC-DC switch SW2 shown in (2) of FIG. 10 corresponds to an on period controlled by the PWM control section 10 from an on-timing (in) of the DC-DC switch SW2. In synchronism with the on-timing (in), the secondary synchronizing rectifier switch SW3 of the converter transformer T1 is turned on as shown in (3) of FIG. 10. This is because the DC-DC converter 4A is controlled so as to configure a forward type converter.

Namely, the energy excited at the secondary side of the converter T1 during the on period of the DC-DC switch SW2 is discharged from the secondary side of the transformer T1 at the on-timing of the synchronizing rectifier switch SW3 synchronized with the DC-DC switch SW2. The starts of the current conducting periods of the primary DC-DC switch SW2 and the secondary synchronizing rectifier switch SW3 are made coincident with each other.

Then, the starts (start time points) of the input current conducting periods of the backlight inverter 6 are made coincident with each other in synchronism with the on-timing (in) of the secondary synchronizing rectifier switch SW3. When the synchronizing rectifier switch SW3 is turned on, a current flows through the smoothing capacitor C2 via the coil L2 due to the energy excited at the secondary side of the converter transformer T1 of the DC-DC converter 4A. When the synchronizing rectifier switch SW3 is turned on, a direct current voltage smoothed by a so-called voltage decreasing operation in which a current flows through the flowback diode D2 is output from the smoothing capacitor C2 at any time. Moreover, the synchronizing rectifier switch SW3 is turned on, and at the same time, a switching element (not shown) in the backlight inverter 6 is turned on as shown in (4) of FIG. 5, and an input current begins flowing.

Namely, the output stage of the DC-DC converter 4 and the input stage of the backlight inverter 6 are simultaneously turned on while the smoothing capacitor C2 is interposed, and the starts of the current conducting periods are made coincident with each other. In this manner, a ripple current of the smoothing capacitor C2 can be reduced.

Since the forward type converter is used as the DC-DC converter 4A in the fourth embodiment, the starts of the current conducting periods of the primary and secondary sides of the converter transformer T1 can be also made coincident with each other.

Figure 12:
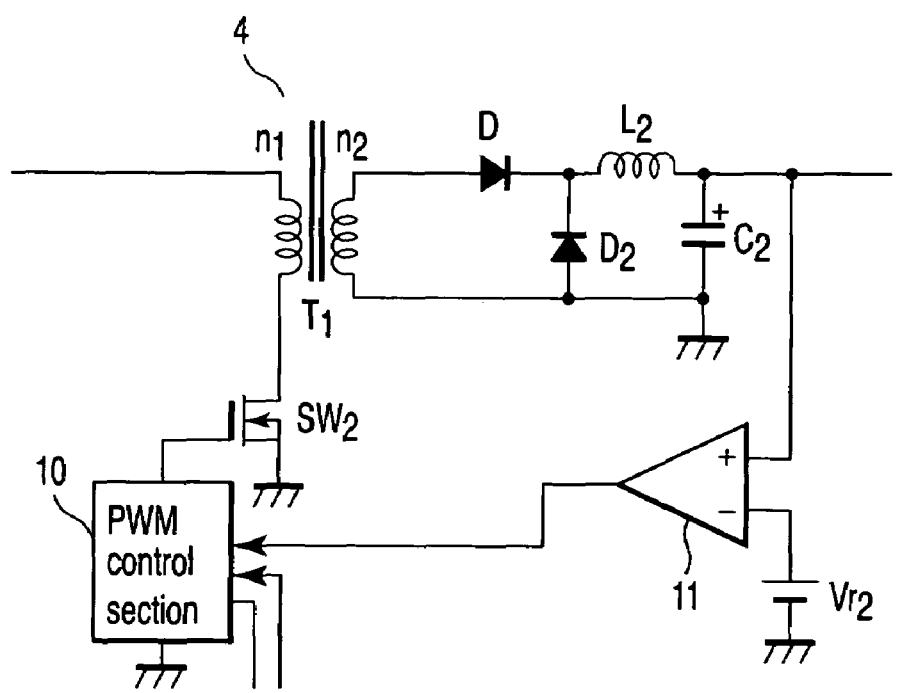

In the first to fourth embodiments, the DC-DC converter 4 or 4A has been configured to carry out synchronizing rectification by using the switching element SW3, the secondary coil n3 for controlling on/off of the switching element SW3 and the comparator circuit 12, but not limited thereto. It is also allowed that rectifier diodes D are configured to be allocated in series on an output line of the secondary coil n2 of the converter transformer T1, as shown in FIGS. 11 and 12. Accordingly, the output stage of the DC-DC converter 4 and the input stage of the backlight inverter 6 are simultaneously turned on while the smoothing capacitor C2 is interposed, thus making it possible to attain advantageous effect that the starts of the current conducting periods can be made coincident with each other, and a ripple current of the smoothing capacitor C2 can be reduced.

However, it is more advantageous to carry out synchronizing rectification by the switching element SW3 because an electric power loss is reduced more remarkably than a case of using the rectifier diode D. FIG. 11 corresponds to the first and third embodiments, and FIG. 12 corresponds to the second and fourth embodiments.

The first to fourth embodiments have described a configuration of using the backlight inverter 6 for use in a liquid crystal panel such as a liquid crystal TV as an alternating current driver circuit. Without being limited thereto, as shown in FIG. 13, in such a device type without an inverter as a direct viewing tube TV receiver or a triode type rear projection TV receiver, control is made so as to match the starts of the current conducting periods between the circuits interconnected to each other while at least a smoothing capacitor is interposed from among the circuits of individual sections of the switching power supply device. At this time, synchronization is carried out with an oscillation signal of an oscillator 61A and an oscillation signal obtained by phase-adjusting the oscillation signal, the oscillation signal of the oscillator 61A being a reference for generating a horizontal sync signal of a horizontal deflection circuit 6A used to supply a horizontal deflection current to a deflection yoke (not shown) of a cathode-ray tube (CRT) 60A. In this manner, a ripple current of the smoothing capacitor can be reduced in the circuits of the individual sections.

Further, while the above-described embodiments have described a case in which power MOSFET is used as a switching element, another bipolar transistor or another switching element such as IGBT may be used.

In addition, the above-described embodiments have described that a system of a switching power supply of a DC-DC converter is of flyback type in the first embodiment and of forward type in the second embodiment. However, another system, for example, a half-bridge converter, a full-bridge converter, or a push-pull converter and the like may be used.

Further, the above embodiments have described that the starts of the current conducting periods are made coincident with each other. However, the starts of the current conducting periods must not be necessarily coincident with each other, and the rear stage may be made slower than the front stage.

Although the above embodiments have described that the PFC converter, the DC-DC converter (similar to the synchronizing rectifier circuit), and the inverter match the current conducting periods each other at the same frequency, advantageous effect can be attained even if there is a short period in which frequencies are different from each other when power is supplied or when a load is suddenly changed or in which the starts of the current conducting periods are not or cannot be made coincident with each other.

As has been described above, according to the present invention, a switching element in each circuit is controlled in a switching power supply device, whereby control is made so as to match the starts of the current conducting periods between the circuits interconnected to each other while at least smoothing capacitor is interposed from among the circuits of the switching power supply device. Namely, control is made so as to match the starts of the conduction of the current conducting periods each other in the circuits at the input and output sides of the smoothing capacitor, whereby a "ripple current value" of the smoothing capacitor is reduced and a "capacitance value" is reduced, making it possible to downsize the smoothing capacitor. As a result, the capacitor cost can be reduced.

A reason why the "ripple current value" can be reduced is that the currents flowing into and out of the smoothing capacitor are reduced. That is, the starts of conduction of the current input periods of the output circuit at the front stage and the input circuit at the rear stage are made coincident with each other with respect to the smoothing capacitor, whereby no current flows through the capacitor (an amount of current is reduced), and a current flows directly from the output circuit to the input circuit. In this manner, a ripple current of the capacitor is reduced.

In addition, a reason why the "capacitance value" can be reduced is that the starts of conduction of the current input periods of the output circuit at the front stage and the input circuit at the rear stage are made coincident with each other with respect to the smoothing capacitor, whereby a maximum value of a current flowing into the capacitor and a maximum value of a current flowing out of the capacitor are reduced, thus reducing a voltage ripple value generated in the smoothing capacitor. In this manner, the capacitance value can be reduced.

The present invention reduces a ripple current and a ripple voltage of each smoothing capacitor in each circuit of a switching power supply device for use in electronic equipment, enabling downsizing and efficient use of the power supply device. The present invention can be widely utilized for electronic equipment using the switching power supply device.

The present invention is not limited to the above-described embodiments. The invention can be embodied by variously modifying constituent elements without departing the spirit of the invention at a stage of carrying out the invention. In addition, a plurality of constituent elements disclosed in the above-described embodiments are properly combined with each other, whereby a variety of inventions can be formed. For example, some of all the constituent elements shown in the embodiments may be eliminated. Further, constituent elements according to the different embodiments may be properly combined with each other.

What is claimed is:

1. A switching power supply device comprising:
 a power converter;
 a first smoothing capacitor coupled to the power converter;

a DC-DC converter including a converter transformer with a primary coil and a secondary coil, the primary coil being coupled to the power converter and the first smoothing capacitor;

a second smoothing capacitor coupled to the secondary coil of the DC-DC converter;

a synchronizing rectifier circuit coupled to the secondary coil of the DC-DC converter;

an alternating current driver circuit; and control means for coordinating start time points of current conducting periods between (i) an output of the power converter and an input to the DC-DC converter to coincide with each other and (ii) an output of the DC-DC converter and an input of the alternating current driver circuit to coincide with each other.

2. A switching power supply device according to claim 1, wherein the power converter comprises a first switching element, a coil and a diode, the power converter to switch a voltage obtained by rectifying an alternating current power supply and to smooth and output energy maintained in the coil.

3. A switching power supply device according to claim 2 further comprising a second switching element coupled to the primary coil to switch an output voltage from the power converter.

4. A switching power supply device according to claim 3, wherein the second smoothing capacitor is coupled to the secondary coil to smooth and output the switched output voltage produced by the DC-DC converter and the second switching element.

5. A switching power supply device according to claim 4, wherein the synchronizing rectifier circuit to carry out synchronizing rectification by a third switching element coupled to the secondary coil and the second smoothing capacitor.

6. A switching power supply device according to claim 5, wherein the alternating current driver circuit including a first oscillator, the alternating current driver circuit to receive an output voltage from the synchronizing rectifier circuit and to drive a load by carry out switching by use of a first oscillation signal from the first oscillator.

7. A switching power supply device according to claim 6, wherein the control means comprises:

a timing signal generator circuit including (i) a second oscillator controlled so as to oscillate at a frequency equal to that of the first oscillator provided in the alternating current driver circuit, (ii) a timing phase adjuster circuit to adjust a phase of a second oscillation signal from the second oscillator, to control an operating timing of each of the first, second and third switching elements based on the phase-adjusted second oscillation signal, and to coordinate the start time points of current conducting periods between the power converter and the input to the DC-DC converter, and (iii) a phase comparator circuit to compare phases of the first oscillator signal and the second oscillation signal adjusted by the timing phase adjuster circuit.

8. A switching power supply device according to claim 7, wherein the control means further comprises:

a first control section to receive the second oscillation signal from the second oscillator, to compare an output voltage of the power converter with a reference voltage to control a pulse width of the second oscillation signal so that the output voltage becomes constant, and to control the first switching element to be switched by the second oscillation signal of the controlled pulse width.

9. A switching power supply device according to claim 8, wherein the control means further comprises:

a second control section to compare a voltage obtained from the secondary side of the converter transformer with a reference voltage to control the third switching element.

10. A switching power supply device comprising:

a DC-DC converter comprises a converter transformer including a primary coil operating as a portion of an input stage of the DC-DC converter and a secondary coil operating as a portion of an output stage of the DC-DC converter;

an alternating current driver circuit including a first oscillator, the alternating current driver circuit being configured to receive an output voltage and to drive a load using a first oscillation signal from the first oscillator;

a first smoothing capacitor positioned between the DC-DC converter and the alternating current driver circuit; and control means for adjusting a phase of the first oscillation signal to coincide start time points of current conducting periods between the output stage of the DC-DC converter and an input stage of the alternating current driver circuit.

11. A switching power supply device according to claim 10, wherein the DC-DC converter being configured to switch a voltage obtained by rectifying an alternating current power supply to the input stage of the DC-DC converter by use of a first switching element and to smooth and output the switched voltage by use of the first smoothing capacitor coupled to the output stage of the DC-DC converter.

12. A switching power supply device according to claim 11 further comprising:

a synchronizing rectifier circuit to carry out synchronizing rectification by a second switching element and the first smoothing capacitor, the second switching element being coupled to the output stage of the DC-DC converter.

13. A switching power supply device according to claim 12, wherein the control means further controlling an operating timing of each of the first and second switching elements based on the phase-adjusted first oscillation signal.

14. A switching power supply device according to claim 13, wherein the control means comprises:

a timing signal generator circuit including a second oscillator controlled so as to oscillate at a frequency substantially equal to an oscillating frequency of the first oscillator provided in the alternating current driver circuit;

a timing phase adjuster circuit configured to adjust a phase of a second oscillation signal from the second oscillator; and a phase comparator circuit to control a phase relationship between the first oscillation signal and the second oscillation signal.

15. A switching power supply device according to claim 14, wherein the control means further comprises:

a first control section configured to receive the phase-adjusted second oscillation signal from the timing phase adjuster circuit, compare an output voltage of the DC-DC converter with a reference voltage to control a pulse width of the phase-adjusted second oscillation signal such that the output voltage becomes constant, and control the first switching element to be switched by the second oscillation signal having the controlled pulse width; and a second control section configured to compare a voltage associated with from the secondary coil of the converter transformer with a reference voltage and control the second switching element to be switched based on a result of the comparison.

16. A switching power supply device according to claim 10, wherein the alternating current driver circuit is a backlight inverter of a liquid crystal panel.

17. A switching power supply device according to claim 10, wherein the alternating current driver circuit is a horizontal deflection circuit of a cathode-ray tube.

18. A method comprising:
switching a voltage at a primary side of a converter transformer of a DC-DC converter by a first switching element;
smoothing and outputting the switched voltage by a first smoothing capacitor coupled to a secondary side of the converter transformer;
carrying out synchronizing rectification by a second switching element and the first smoothing capacitor, the second switching element being provided on a secondary output line of the converter transformer;
inputting an output voltage over the secondary output line to cause an alternating current driver circuit to drive a load, a level of the output voltage being controlled by controlling switching of the first switching element and the second switching element using a first oscillation signal from an oscillator;
matching start time points of current conducting periods of the DC-DC converter and the alternating current driver circuit with the first smoothing capacitor interposed between the DC-DC converter and the alternating current driver circuit.

19. A method according to claim 18, wherein the voltage switched at the primary side of the converter transformer is a voltage obtained by rectifying an alternating current power supply.

20. A method according to claim 19, wherein prior to matching the start time points, the method further comprising:
adjusting a phase of the first oscillation signal; and
controlling an operating timing of each of the first and second switching elements based on the phase-adjusted first oscillation signal.

* * * * *